US 6,657,586 B2

(12) United States Patent
Turner (10) Patent No.: US 6,657,586 B2
(45) Date of Patent: Dec. 2, 2003

(54) SYSTEM AND METHOD FOR LOCATING AN OBJECT USING GLOBAL POSITIONING SYSTEM RECEIVER

(75) Inventor: Thomas E. Turner, Winter Springs, FL (US)

(73) Assignee: Wherenet Corp, Santa Clara, CA (US)

( * ) Notice: Subject to any disclaimer, the term of this patent is extended or adjusted under 35 U.S.C. 154(b) by 12 days.

(21) Appl. No.: 10/137,746

(22) Filed: May 2, 2002

(65) Prior Publication Data

US 2003/0001775 A1 Jan. 2, 2003

Related U.S. Application Data

(60) Provisional application No. 60/288,582, filed on May 3, 2001.

(51) Int. Cl.⁷ .............................................. H04B 7/185
(52) U.S. Cl. ............................ 342/357.07; 342/357.03; 342/357.06; 701/215
(58) Field of Search ....................... 342/357.01, 357.03, 342/357.06, 357.07; 701/213, 215; 455/456.1, 456.3, 457

(56) References Cited

U.S. PATENT DOCUMENTS

| | | | |
|---|---|---|---|
| 4,220,923 A | 9/1980 | Pelchat et al. | 455/295 |
| 4,608,569 A | 8/1986 | Dickey, Jr. et al. | 343/384 |
| 4,931,977 A | 6/1990 | Klemes | 364/581 |
| 5,393,965 A | 2/1995 | Bravman et al. | 235/383 |
| 5,418,812 A | 5/1995 | Reyes et al. | 375/1 |
| 5,493,307 A | 2/1996 | Tsujimoto | 342/380 |
| 5,528,621 A | 6/1996 | Heiman et al. | 375/200 |
| 5,536,930 A | 7/1996 | Barkan et al. | 235/472 |
| 5,646,389 A | 7/1997 | Bravman et al. | 235/385 |
| 5,768,140 A | 6/1998 | Swartz et al. | 364/478.13 |
| 5,768,531 A | 6/1998 | Lin | 395/200.72 |
| 5,802,101 A | 9/1998 | Maruyama | 375/206 |
| 5,812,589 A | 9/1998 | Sealander et al. | 375/200 |
| 5,818,517 A | 10/1998 | Hudson et al. | 348/21 |
| 5,850,187 A | 12/1998 | Carrender et al. | 340/825.54 |
| 5,920,287 A | 7/1999 | Belcher et al. | 342/450 |
| 5,923,702 A | 7/1999 | Brenner et al. | 375/202 |
| 5,995,046 A | 11/1999 | Belcher et al. | 342/450 |
| 6,031,863 A | 2/2000 | Jusa et al. | 375/202 |
| 6,121,926 A | 9/2000 | Belcher et al. | 342/450 |
| 6,127,976 A | 10/2000 | Boyd et al. | 342/463 |
| 6,128,549 A | 10/2000 | Swartz et al. | 700/225 |
| 6,236,365 B1 | 5/2001 | LeBlanc et al. | 342/457 |
| 6,268,723 B1 | 7/2001 | Hash et al. | 324/243 |
| 6,356,802 B1 * | 3/2002 | Takehara et al. | 700/215 |
| 6,377,203 B1 * | 4/2002 | Doany | 342/44 |

FOREIGN PATENT DOCUMENTS

| | | | |
|---|---|---|---|
| EP | 1 050 793 A2 | 11/2000 | G06F/1/16 |
| WO | 99/37047 | 7/1999 | H04J/3/02 |

* cited by examiner

Primary Examiner—Dao Phan
(74) Attorney, Agent, or Firm—Allen, Dyer, Doppelt, Milbrath & Gilchrist, P.A.

(57) ABSTRACT

A system and method for locating an object uses a plurality of tag signal readers that receive wireless tag signals from a tag transmitter coupled with an object to be located. The tag signals include data indicating the identity of the object to which the tag transmitter is coupled. Each tag signal reader includes a global positioning system receiver associated therewith for determining the location of a tag signal reader. A wireless transmitter transmits a wireless data signal incorporating the wireless tag signal and location of the tag signal reader to a location processor, which receives the wireless data signals and determines which tag signals are first-to-arrive signals and conducts differentiation of the first-to-arrive signals to locate a tag transmitter and object coupled therewith.

23 Claims, 4 Drawing Sheets

SYSTEM AND METHOD FOR LOCATING AN OBJECT USING GLOBAL POSITIONING SYSTEM RECEIVER

RELATED APPLICATION

This application is based upon prior filed copending provisional application Ser. No. 60/288,582 filed May 3, 2001.

FIELD OF THE INVENTION

This invention relates to the field of object location and tracking systems for asset management systems, and more particularly, this invention relates to object tracking and location systems using a plurality of tag signal readers and differentiation of first-to-arrive signals to locate a tag transmitter coupled with an object to be located.

BACKGROUND OF THE INVENTION

In commonly assigned U.S. Pat. Nos. 5,920,287; 5,995,046; 6,121,926; and 6,127,976, the disclosures which are hereby incorporated by reference in their entirety, a real time location system is disclosed using a plurality of tagged emission (signal) readers that are disbursed throughout a monitored environment, such as a manufacturing environment. The tag signal readers are operative with a location processor to determine which tag signals transmitted from tag transmitters are first-to-arrive signals. The location processor conducts differentiation of the first-to-arrive signals to locate a tag within the monitored environment.

These location and tracking systems provide asset management that not only addresses the need to locate and track different components in the course of their travel through a manufacturing and assembly sequence, but also addresses the more general problem concerning component and equipment inventory control and allow control concerning the whereabouts of any and all assets of a business, factory, educational, military, or recreational facility. In some systems, status information can be provided to a tag transmitter by means of sensors associated with the tag. Typically, the tag signal readers are placed at known locations throughout the environment having the objects to be located or tracked. The system uses time-of-arrival differentiation of repetitive spread spectrum, short duration pulse "blinks" from object-attached tags. The system provides the practical, continuous identification of the location of each and every object within the environment of interest, irrespective of whether the object is stationary or moving.

These systems are especially applicable for indoor environments, but usually cannot be applied in some outdoor environments, such as large construction sites, e.g., a pipeline construction area having multiple construction sites that may change often, where there is a requirement to track high value assets and provide information on their location and status based on their geolocation and real-time telemetry information.

There is, therefore, a need for a system that locates high value assets, such as at large construction sites and adjacent "laid down areas." It is also desirable to have a mobile system that benefits mobile construction projects, such as the construction of oil and gas pipelines where the actual construction site moves to a different geographic location on a daily basis. Military applications requiring rapid deployment forces and material support should have a system where the departure and landing operations can be facilitated by real-time tracking of the location of high value assets, including personnel, and where a geolocation is integral to integration with other operational systems. Sporting events and other public events would be advantageously served with such a system that rapidly deploys and uses location capability to support public safety for the management of high value assets available at the site.

SUMMARY OF THE INVENTION

The present invention advantageously solves the above-identified problems by providing a system for locating an object and is advantageously used in outdoor environments where there is a requirement to track high value assets and provide information on their location and status based on geolocation and real-time telemetry information. The system is relatively easy to set up and can operate in a mobile environment.

In accordance with the present invention, the system for locating an object includes a plurality of tag signal readers that receive wireless tag signals from a tag transmitter coupled with an object to be located. The tag signals have data indicating the identity of the object to which the tag transmitter is coupled. Each tag signal reader includes a global positioning system receiver associated therewith for determining the location of a tag signal reader. A wireless transmitter transmits a wireless data signal incorporating the wireless tag signal and location information of the tag signal reader.

A location processor receives the wireless data signal from the tag signal readers and determines which tag signals are first-to-arrive signals. The location processor conducts differentiation of the first-to-arrive signals relative to the location of the tag signal readers as determined by the global positioning system receivers to locate a tag transmitter and high value asset as an object coupled therewith.

In another aspect of the present invention, the wireless tag signals comprise pseudo random spread spectrum radio frequency signals. The location processor comprises a matched filter correlator that could include matched filter banks having parallel correlators that correlate a received communication signal with time offset versions of a reference spreading code. The location processor could also include a plurality of processors for distributing the processing capability. At least three tag signals can be used for determining the location of the object to be located.

In yet another aspect of the present invention, each tag signal reader includes a plurality of mutually diverse antennas for detecting wireless tag signals at each tag signal reader. Each tag signal reader is formed as a mobile device having a battery for self-powering the tag signal reader. The wireless data signal transmitted from a tag signal reader could comprise telemetry information regarding power levels of a battery within the tag signal reader. The wireless data signal transmitted from a wireless transmitter could comprise a packet signal that includes a header containing global positioning system information related to the location of the wireless transmitter. The global positioning system receiver at each tag signal reader preferably comprises a differential global positioning system receiver.

A method of the present invention is also disclosed and comprises the steps of generating a wireless tag signal to a plurality of tag signal readers from a tag transmitter coupled with an object to be located. The tag signals have data indicating the identity of the object to which the tag transmitter is coupled. Each tag signal reader includes a global positioning system receiver associated therewith for determining the location of a tag signal reader.

The method further comprises the step of transmitting a wireless data signal and incorporating the wireless tag signal and location of the tag signal reader and receiving within the location processor the wireless data signal from the tag signal reader. The method also comprises the step of determining which signals are first-to-arrive signals and conducting differentiation of the first-to-arrive signals relative to the location of the tag signal readers as determined by the global positioning system receivers to locate a tag transmitter and object coupled therewith.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The present invention advantageously overcomes prior art location and tracking architectures and can be used in numerous outdoor environments where there is a requirement to track high value assets and provide information on their location and status based on geolocation and real-time telemetry information. The system can be designed as a mobile system and can be relatively easy to establish and operate in a mobile environment. The system is specifically applicable to large construction sites where there is a requirement to deploy rapidly a system for the tracking of high value assets in or at the site and adjacent "lay down areas," and in association where other tracking systems using GPS data for tracking purposes. The mobile nature of the system is beneficial to mobile construction projects, such as oil and gas pipelines, where the construction sites move on a daily basis.

Military applications are beneficially served by the present invention where rapid deployment is required for departure and landing operations, which can also be facilitated by the real-time tracking of high value assets, including personnel, and where the provision of a geolocation system is integral to integration with other operational systems. The system is also applicable to sporting events and other public events where the ability to rapidly deploy a system with location capability can be used to support public safety or the management of high value assets available at the site.

The system provides geocoded location information based on integration with global positioning system receivers. It also provides for the location of assets and coupled tag transmitters to assets to within three meters. The tag signal readers can be designed to be located on vehicles, trailers or pallet based shipping devices for easy transport and deployment. The wireless communication link between the tag signal readers and a location processor of the present invention could be a local area network using 802.11 standards or any other high speed communication system capable of transmitting information from the tag signal readers to the location processor. The location processor could also be located in a vehicle, trailer, mobile communication center or other area and designed for easy deployment and self-powered operation.

Figure 1:
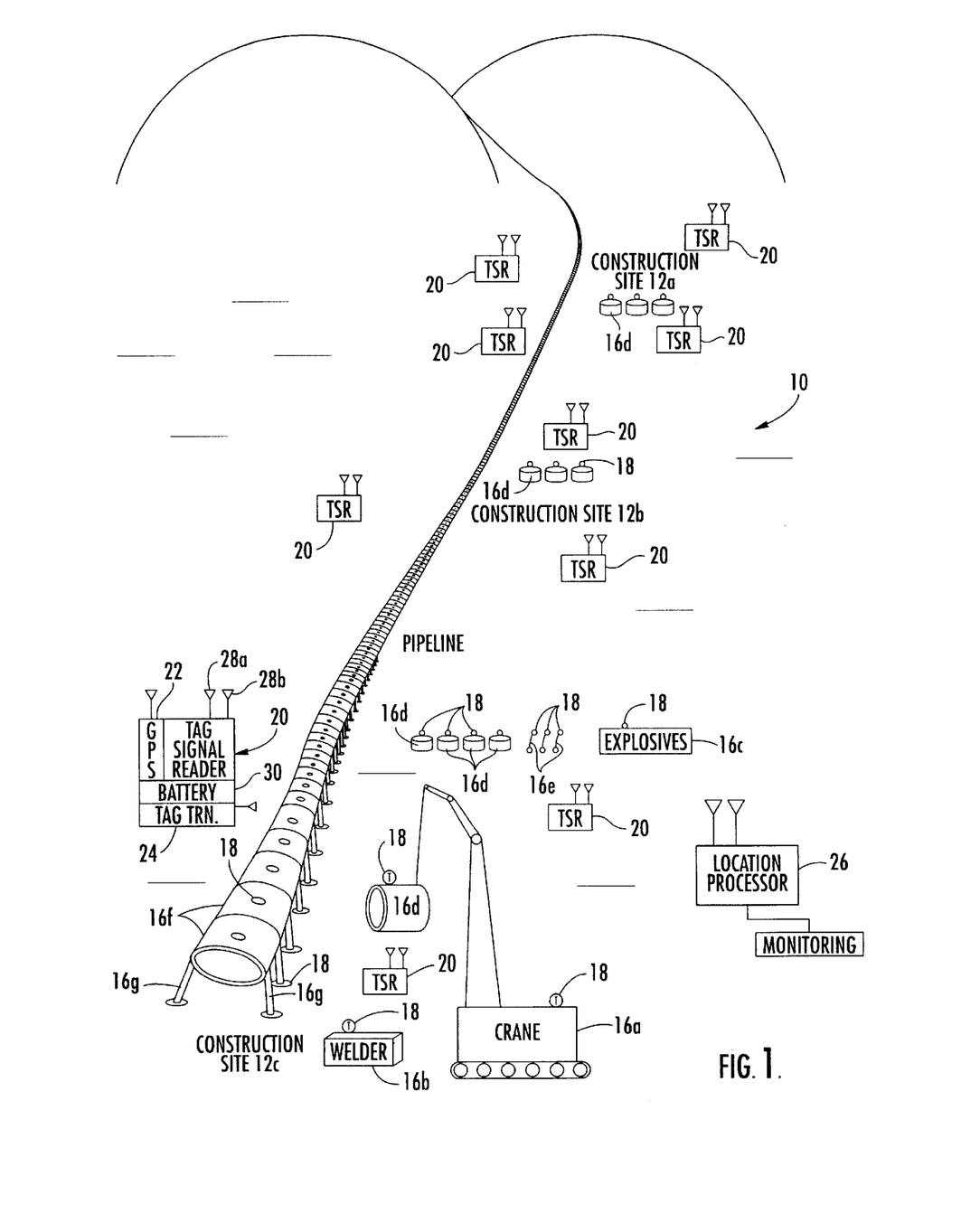
FIG. 1 is a block diagram of the system of the present invention showing different tag transmitters associated with high value assets in a large construction site, a plurality of tag signal readers operative with a global positioning system receiver, and a location processor.

FIG. 1 illustrates an overall block diagram of the system 10 and showing an oil pipeline construction area having a construction length of many miles. Different construction sites 12a, 12b, 12c are operative at the oil pipeline construction site and can change daily as construction proceeds. Some or all of the construction sites include high value assets, such as illustrated crane 16a, welder 16b, explosives crate 16c, inventory of pipeline sections 16d, pipeline supports 16e, assembled pipeline sections 16f, and assembled pipeline supports 16g. Each asset has a tag transmitter 18 coupled thereto. Other examples of such high value assets could be machinery, temporary housing supplies, or other high value assets as suggested by those skilled in the art. Naturally, even though only an oil pipeline construction site is illustrated, the present invention is applicable to many outdoor/indoor and mobile environments, as suggested by those skilled in the art.

A plurality of tag signal readers 20 are positioned in each of the construction sites around the assets for receiving wireless tag signals from a tag transmitter 18 coupled with an object or asset to be located. The transmitted tag signals have data indicating the identity of the object to which the tag transmitter is coupled. Other data could also be appended to the transmission as suggested by those skilled in the art.

Each tag signal reader 20 includes a global positioning system receiver 22 associated therewith for determining the location of a tag signal reader. A wireless transmitter 24 transmits a wireless data signal incorporating the wireless tag signal and location of the tag signal reader 20 as determined by the global positioning system receiver 22.

As illustrated, a location processor 26 receives the wireless data signal from the tag signal readers 20 and determines which tag signals are first-to-arrive signals and conducts differentiation of the first-to-arrive signals relative to the location of the tag signal readers as determined by the global positioning system receivers to locate a tag transmitter and object coupled therewith.

Much of the technology and detection capability as associated with the system and method of the present invention can use the circuitry and algorithms described in the commonly assigned U.S. Pat. Nos. 5,920,287; 5,995,046; 6,121,926; and 6,127,976. Also, improvements to the aforementioned systems disclosed in the above-identified and incorporated by reference patents can also be used and are found in commonly assigned U.S. patent application Ser. Nos. 10/038,532; 09/997,282; 10/033,529; and 10/023,481, the disclosures which are hereby incorporated by reference in their entirety.

Although operation of the tag transmitters can vary depending on the type of circuitry chosen by those skilled in the art, in one aspect of the invention, a tag transmitter transmits or "blinks" a very short duration, wideband (spread spectrum) pulse of radio frequency energy that is encoded with information, such as that representative of the identification of the object, and other object-associated information stored in a memory. For example, a high value asset, such as the illustrated pipeline sections 16d or explosives crate 16c, could include associated status information such as temperature data supplied by a temperature sensor installed within or external to the tag transmitter. Thus, not only would the location information for the explosives crate 16c be critical, but also the sensed temperature data would be critical. A monitoring station 26a operative with the location processor 26 could provide user monitoring of the entire construction site. Each tag transmitter could repeatedly transmit a spread spectrum encoded RF signal in a random manner such that from a radio frequency observation standpoint, a plurality of such tagged objects within the environment could be considered akin to a random "blinking" of a field of fire flies.

As non-limiting examples, the tag transmitter can transmit a long range spread spectrum radio signal having an occurrence rate of beacon signals that can be programmable to allow flexibility with regard to location update rate versus battery life. There could be a default setting where the update is every four minutes, to extend battery life. Each tag transmitter can have a unique internal identification number that is transmitted via radio frequency and could also be read with a bar code scanner, if necessary. This could allow seamless integration of a bar code system with the location system. The tag transmitter could include a memory having a read/write memory that acts as a portable data file to carry data between various environments and provide a field accessible, distributed database. The frequency range can vary, but as one non-limiting example, it could be about 2.4 to about 2.483 GHz. The typical read range can range from about 350 feet to greater than 1,000 feet in some instances, and even greater depending on the type of system and transmitter.

As to the tag signal readers, they include an active receiver and antenna array in some examples that capture spread spectrum radio signals from the tag transmitters. They are typically installed in a grid pattern to provide complete coverage to a site. They can be mounted from as little as 250 feet apart to as much as 750 feet apart and higher. They include the appropriate circuitry, transmitter circuitry, and GPS receiver circuitry, as suggested by those skilled in the art. Although only one location processor is illustrated, each construction site could include a number of location processors, where a plurality such as eight tag signal readers are associated with an individual location processor. The number of tag transmitters that could be used for the entire system could be in the tens of thousands, depending on the blink rate of the tag transmitters.

Each of the tag signal readers 20 could be installed at relatively unobtrusive locations within the construction site, including on trailers, pallets, building frames, or other locations as suggested by skilled in the art. Each of the tag signal readers 20 can include a plurality of mutually diverse antennas 28a, 28b for detecting wireless tag signals at each tag signal reader.

Although mutually diverse antenna are illustrated, it is also possible that an omnidirectional, circularly polarized antenna could be used as noted in some of the aforementioned and incorporated by reference patents. This would allow a tag signal reader to receiver signals from any direction and provide hemispherical coverage within an environment to maximize response to the horizon and diminish response by several decibels to signals arriving from a vertical (downward) direction, which could be advantageous in some cases. The use of mutually diverse antennas, on the other hand, obviates some multipath based fades and nulls. It is also possible to incorporate configuration and/or sensitivity diversity into the antennas, such as by using orthogonally polarized antennas.

Figure 2:
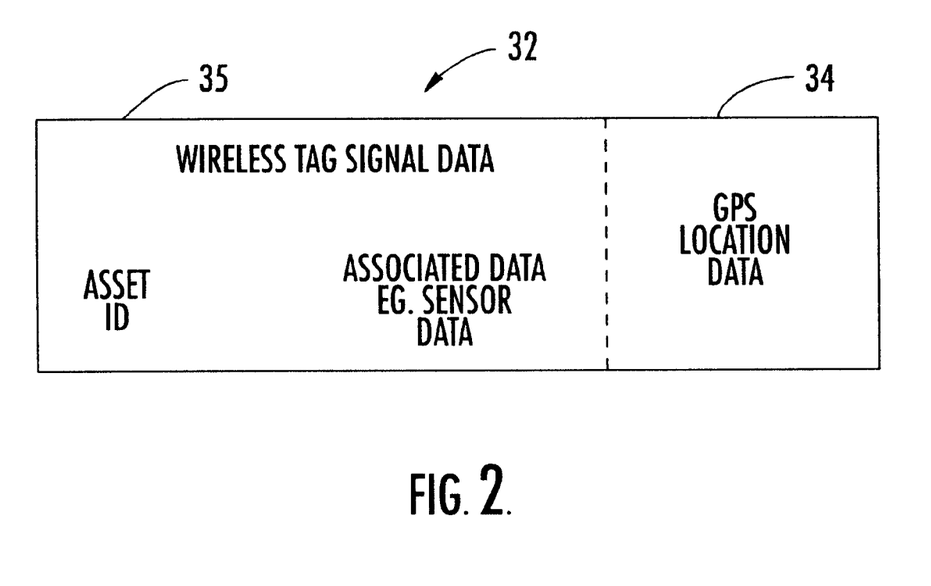
FIG. 2 is a block diagram of a packet corresponding to the wireless data signal transmitted from a tag signal reader that incorporates the wireless tag signal and GPS location data of the tag signal reader.

The tag signal readers 20 are typically configured as a mobile device, and include a battery 30 for self-powering the tag signal reader. The wireless data signals transmitted from a tag signal reader can include telemetry information regarding the power levels of a battery 30 within the tag signal reader. The wireless data signal could comprise a wireless packet 32 that includes a header 34 containing global positioning system information related to the location of a wireless transmitter shown in the fragmentary drawing view of FIG. 2, but also the identification data and other associated data for the wireless tag signal data 35 as explained above.

Each tag signal reader 20 includes the global positioning system receiver 22, which preferably is formed as a differential global positioning system receiver. As is well known to those skilled in the art, a global positioning system receiver uses two dozen satellites and at least three and preferably four satellites to determine location of the receiver. Although the basic global positioning system can be used for the present invention, it is preferred if a differential GPS (DGPS) system is used, including a geographically known location GPS reference station, which compares any predicted pseudo ranges from its known position to measure pseudo ranges and computes differences or corrections for all satellites in the view and broadcasts these over a separate data link. The global positioning system receiver then applies the corrections to its own pseudo range measurements for computation of its position.

By this process, ionospheric and tropospheric propagation and satellite position errors common to the user and a reference station can be eliminated. User position accuracies using the GDPS technique can reach accuracy to within two meters. It is also possible to use pseudo-satellites (pseudolites) located on the ground and transmitting GPS-like signals to the user. This advanced system using pseudolites tends to reduce the geometric dilution in the system. It is also possible that the carrier phase of the GPS signal, rather than only the code phase (pseudo range), is measured to determine the tag signal reader position via the GPS receiver 22. The carrier cycle ambiguity is typically resolved in these instances.

In the present invention, the simultaneous processing of tag signal receptions from multiple antennas at different locations also allows the system architecture, as shown in FIG. 1, to obtain significant cost reduction for some applications.

Figure 3:
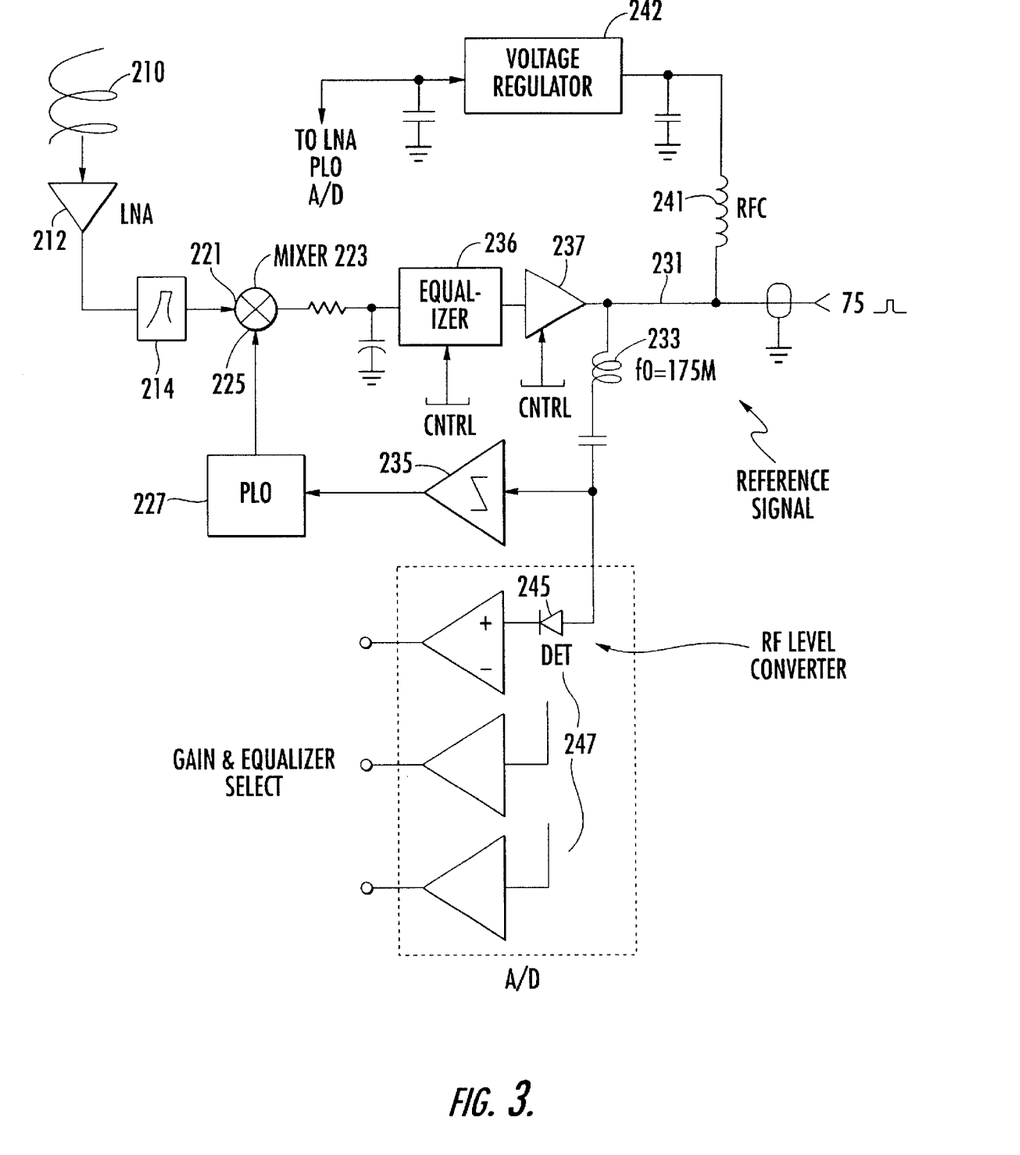
FIG. 3 is a high level block diagram of one example of circuit architecture that can be used for the tag signal reader.
Figure 4:
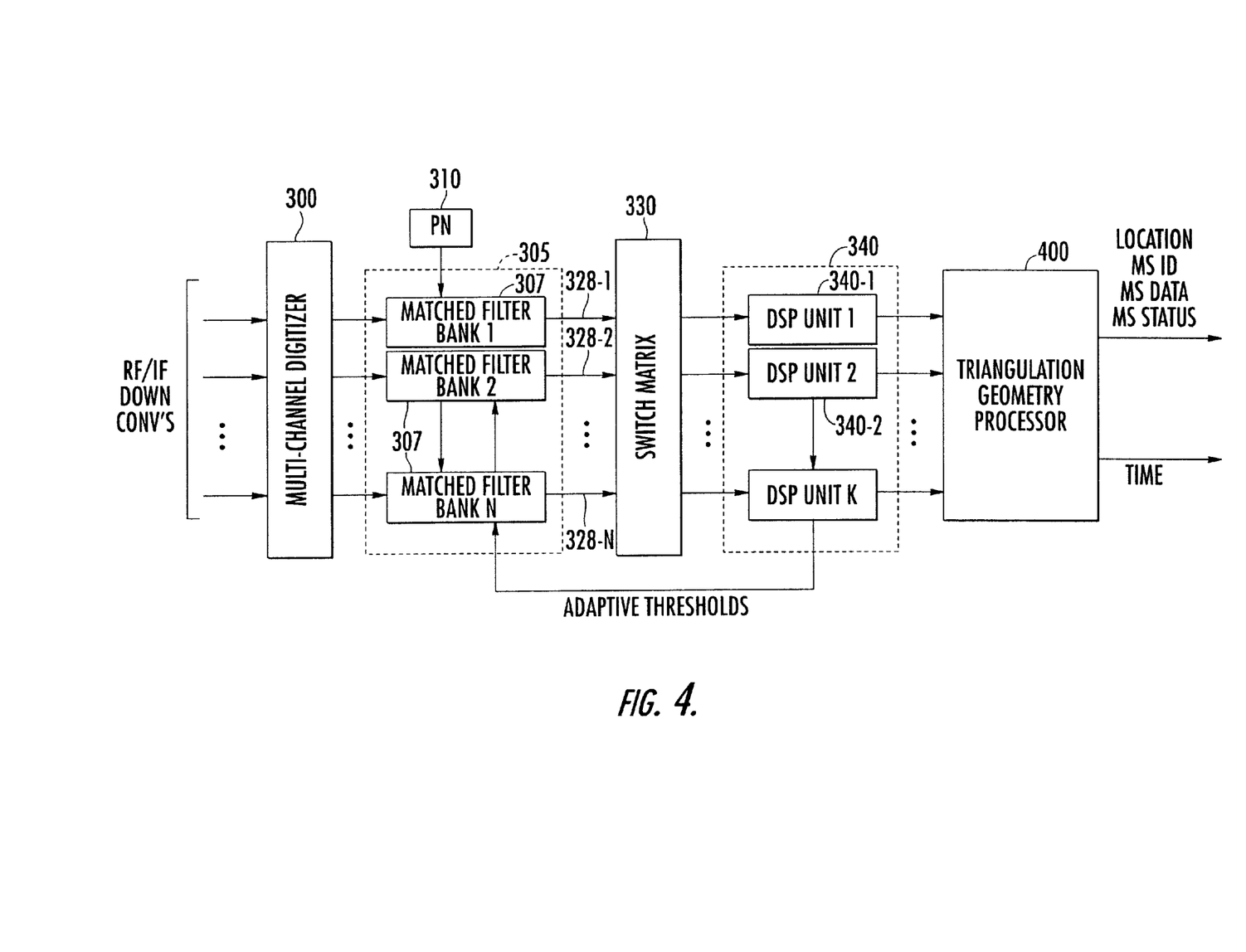
FIG. 4 is another high level block diagram of one example of circuit architecture that can be used for a correlation-based, RF signal location processor in accordance with the present invention.

FIGS. 3 and 4 represent examples of the type of circuits that can be used with modifications as suggested by those skilled in the art for tag signal reader circuitry and location processor circuitry to determine which tag signals are first-to-arrive signals and conduct differentiation of first-to-arrive signals to locate a tag. Other details of representative circuits that could be used with various modifications suggested by those skilled in the art are shown in the above-identified and incorporated by reference patents.

Referring now to FIGS. 3 and 4, a representative circuit and algorithm as described in the above mentioned and incorporated by reference patents are disclosed and set forth in the description below to aid in understanding the type of tag signal reader and location processor circuitry can be used for determining which communication signals are first-to-arrive signals and how the processor conducts differentiation of the first-to-arrive signals to locate a tag transmitter and its associated object.

FIG. 3 diagrammatically illustrates one type of circuitry configuration of a respective architecture for "reading" associated communication signals or a pulse (a "blink") used for location determination signals, such as signals emitted from a tag transmitter to the tag signal readers. This circuit can be associated with the tag signal reader of the present invention. An antenna 210 senses appended transmission bursts or other signals from the object and tag transmitter to be located. The antenna in this aspect of the invention could be omnidirectional and circularly polarized, as noted before, and coupled to a power amplifier 212, whose output is filtered by a bandpass filter 214. Naturally, dual diversity antennae could be used as noted in some of the incorporated by reference patents or a single antenna, as also noted in some of the patents. Respective I and Q channels of the bandpass filtered signal are processed in associated circuits corresponding to that coupled downstream of filter 214. To simplify the drawing only a single channel is shown.

A respective bandpass filtered I/Q channel is applied to a first input 221 of a down-converting mixer 223. Mixer 223 has a second input 225 coupled to receive the output of a phase-locked local IF oscillator 227. IF oscillator 227 is driven by a highly stable reference frequency signal (e.g., 175 MHz) coupled over a (75 ohm) communication cable 231 from a control processor. The reference frequency applied to phase-locked oscillator 227 is coupled through an LC filter 233 and limited via limiter 235.

The IF output of mixer 223, which may be on the order of 70 MHz, is coupled to a controlled equalizer 236, the output of which is applied through a controlled current amplifier 237 and preferably applied to communication cable 231 through a communication signal processor, which could be an associated processor as described before. The communication cable 231 also supplies DC power for the various components of the tag signal reader by way of an RF choke 241 to a voltage regulator 242, which supplies the requisite DC voltage for powering an oscillator, power amplifier and analog-to-digital units of the receiver.

A 175 MHz reference frequency can be supplied by a communications control processor to the phase locked local oscillator 227 and its amplitude could imply the length of any communication cable 231 (if used). This magnitude information can be used as control inputs to equalizer 236 and current amplifier 237, so as to set gain and/or a desired value of equalization, that may be required to accommodate any length of any communication cables (if used). For this purpose, the magnitude of the reference frequency may be detected by a simple diode detector 245 and applied to respective inputs of a set of gain and equalization comparators shown at 247. The outputs of comparators are quantized to set the gain and/or equalization parameters.

It is possible that sometimes signals could be generated through the clocks used with the global positioning system receivers and/or other wireless signals. Such timing reference signals can be used as suggested by known skilled in the art.

FIG. 4 diagrammatically illustrates the architecture of a correlation-based, RF signal processor circuit as part of a location processor to which the output of a respective RF/IF conversion circuit of FIG. 3 can be coupled such as by wireless communication (or wired in some instances) for processing the output and determining location based on the GPS receiver location information for various tag signal readers. The correlation-based RF signal processor correlates spread spectrum signals detected by an associated tag signal reader with successively delayed or offset in time (by a fraction of a chip) spread spectrum reference signal patterns, and determines which spread spectrum signal is the first-to-arrive corresponding to a location pulse.

Because each tag signal reader can be expected to receive multiple signals from the tag transmitter due to multipath effects caused by the signal transmitted by the tag transmitter being reflected off various objects/surfaces, the correlation scheme ensures identification of the first observable transmission, which is the only signal containing valid timing information from which a true determination can be made of the distance.

For this purpose, as shown in FIG. 4, the RF processor employs a front end, multichannel digitizer 300, such as a quadrature IF-baseband down-converter for each of an N number of receivers. The quadrature baseband signals are digitized by associated analog-to-digital converters (ADCs) 272I and 272Q. Digitizing (sampling) the outputs at baseband serves to minimize the sampling rate required for an individual channel, while also allowing a matched filter section 305, to which the respective channels (reader outputs) of the digitizer 300 are coupled to be implemented as a single, dedicated functionality ASIC, that is readily cascadable with other identical components to maximize performance and minimize cost.

This provides an advantage over bandpass filtering schemes, which require either higher sampling rates or more expensive analog-to-digital converters that are capable of directly sampling very high IF frequencies and large bandwidths. Implementing a bandpass filtering approach typically requires a second ASIC to provide an interface between the analog-to-digital converters and the correlators. In addition, baseband sampling requires only half the sampling rate per channel of bandpass filtering schemes.

The matched filter section 305 may contain a plurality of matched filter banks 307, each of which is comprised of a set of parallel correlators, such as described in the above identified, incorporated by reference '926 patent. A PN spreading code generator could produce a PN spreading code (identical to that produced by a PN spreading sequence generator of a tag transmitter). The PN spreading code produced by PN code generator is supplied to a first correlator unit and a series of delay units, outputs of which are coupled to respective ones of the remaining correlators. Each delay unit provides a delay equivalent to one-half a chip. Further details of the parallel correlation are found in the incorporated by reference '926 patent.

As a non-limiting example, the matched filter correlators may be sized and clocked to provide on the order of $4 \times 10^6$ correlations per epoch. By continuously correlating all possible phases of the PN spreading code with an incoming signal, the correlation processing architecture effectively functions as a matched filter, continuously looking for a match between the reference spreading code sequence and the contents of the incoming signal. Each correlation output port 328 is compared with a prescribed threshold that is adaptively established by a set of "on-demand" or "as needed" digital processing units 340-1, 340-2, ..., 340-K. One of the correlator outputs 328 has a summation value exceeding the threshold in which the delayed version of the PN spreading sequence is effectively aligned (to within half a chip time) with the incoming signal.

This signal is applied to a switching matrix 330, which is operative to couple a "snapshot" of the data on the selected channel to a selected digital signal processing unit 340-1 of the set of digital signal processing units 340. The units can "blink" or transmit location pulses randomly, and can be statistically quantified, and thus, the number of potential simultaneous signals over a processor revisit time could determine the number of such "on-demand" digital signal processors required.

A processor would scan the raw data supplied to the matched filter and the initial time tag. The raw data is scanned at fractions of a chip rate using a separate matched filter as a co-processor to produce an auto-correlation in both the forward (in time) and backwards (in time) directions around the initial detection output for both the earliest (first observable path) detection and other buried signals. The output of the digital processor is the first path detection time, threshold information, and the amount of energy in the signal produced at each receiver's input, which is supplied to and processed by the time-of-arrival-based multi-lateration processor section 400.

Processor section 400 could use a standard multi-lateration algorithm that relies upon time-of-arrival inputs from at least three readers to compute the location of the tag transmitter. The algorithm may be one which uses a weighted average of the received signals. In addition to using the first observable signals to determine object location, the processor also can read any data read out of a memory for the tag transmitter and superimposed on the transmission. Object position and parameter data can be downloaded to a data base where object information is maintained. Any data stored in a tag memory may be augmented by altimetry data supplied from a relatively inexpensive, commercially available altimeter circuit. Further details of such circuit are found in the incorporated by reference '926 patent.

It is also possible to use an enhanced circuit as shown in the incorporated by reference '926 patent to reduce multi-path effects, by using dual antennae and providing spatial diversity-based mitigation of multipath signals. In such systems, the antennas are spaced apart from one another by a distance that is sufficient to minimize destructive multipath interference at both antennas simultaneously, and also ensure that the antennas are close enough to one another so as to not significantly affect the calculation of the location of the object by a downstream multi-lateration processor.

The multi-lateration algorithm executed by the location processor 26 could be modified to include a front end subroutine that selects the earlier-to-arrive outputs of each of the detectors as the value to be employed in a multi-lateration algorithm. A plurality of auxiliary "phased array" signal processing paths can be coupled to the antenna set (e.g., pair), in addition to any paths containing directly connected receivers and their associated first arrival detectors that feed the locator processor. Each respective auxiliary phased array path is configured to sum the energy received from the two antennas in a prescribed phase relationship, with the energy sum being coupled to associated units that feed a processor as a triangulation processor.

The purpose of a phased array modification is to address the situation in a multipath environment where a relatively "early" signal may be canceled by an equal and opposite signal arriving from a different direction. It is also possible to take advantage of an array factor of a plurality of antennas to provide a reasonable probability of effectively ignoring the destructively interfering energy. A phased array provides each site with the ability to differentiate between received signals, by using the "pattern" or spatial distribution of gain to receive one incoming signal and ignore the other.

The multi-lateration algorithm executed by the location processor 26 could include a front end subroutine that selects the earliest-to-arrive output of its input signal processing paths and those from each of the signal processing paths as the value to be employed in the multi-lateration algorithm (for that receiver site). The number of elements and paths, and the gain and the phase shift values (weighting coefficients) may vary depending upon the application.

It is also possible to partition and distribute the processing load by using a distributed data processing architecture as described in the incorporated by reference '976 patent. This architecture can be configured to distribute the workload over a plurality of interconnected information handling and processing subsystems. Distributing the processing load enables fault tolerance through dynamic reallocation.

The front end processing subsystem can be partitioned into a plurality of detection processors, so that data processing operations are distributed among sets of processors. The partitioned processors are coupled in turn through distributed association processors to multiple location processors. For tag detection capability, each reader could be equipped with a low cost omnidirectional antenna, that provides hemispherical coverage within the monitored environment.

A detection processor filters received energy to determine the earliest time-of-arrival energy received for a transmission, and thereby minimize multi-path effects on the eventually determined location of a tag transmitter. The detection processor demodulates and time stamps all received energy that is correlated to known spreading codes of the transmission, so as to associate a received location pulse with only one tag transmitter. It then assembles this information into a message packet and transmits the packet as a detection report over a communication framework to one of the partitioned set of association processors, and then de-allocates the detection report.

A detection processor to association control processor flow control mechanism equitably distributes the computational load among the available association processors, while assuring that all receptions of a single location pulse transmission, whether they come from one or multiple detection processors, are directed to the same association processor.

The flow control mechanism uses an information and processing load distribution algorithm, to determine which of the association processors is to receive the message, and queues the message on a prescribed protocol coupling socket connecting the detection processor to the destination association processor. To select a destination association processor, the information and processing load distribution algorithm may include a prime number-based hashing operation to ensure a very uniform distribution of packets among association processors. In addition, to provide relatively even partitioning in the case of widely varying transmission rates, the hashing algorithm may use a sequence number contained in each transmission.

Each association processor can organize its received message packets by identification (ID) and time-of-arrival (TOA), and stores them as association reports. The association processor compresses the data within the association report, transmits that information over an association communication process of the communication framework to one of a plurality of distributed location processors, and then de-allocates the association report.

In order to deliver all association reports that have been generated for a tag transmitter to a single destination location processor, the association communication process of the communication framework may employ the same information and processing load distribution algorithm executed by the detection communication process of the communication framework. Each location processor determines the geographical location of a tag transmitter using the time-of-arrival measurement information originally sourced from the detection processors together with the GPS receiver information. The specific algorithm employed for location determination matches the number of arrival time measurements with whatever a priori information is available.

To locate a tag transmitter, a processor may employ all available diversity information associated with the mobile of interest, including, but not limited to the station ID (if any), any data contained in the transmission and metrics indicating confidence it these values. It then forwards a location report containing this information over a location communication process to an asset management data base. A location estimate may be derived from the measured time-of-arrival information in a received association report packet, using a differential time-of-arrival algorithm, such as a hyperbolic geometry-based function.

Naturally, throughout this non-limiting example of processing, the GPS location data will also be taken into account, and thus, based on geoloation of the tag signal reader, the location of an asset having the tag transmitter can be determined anywhere within the system.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

That which is claimed is:

1. A system for locating an object comprising:
a plurality of tag signal readers for receiving wireless tag signals from a tag transmitter coupled with an object to be located, said tag signals having data indicating the identity of the object to which the tag transmitter is coupled, each tag signal reader further comprising a global positioning system receiver associated therewith for determining the location of a tag signal reader, and a wireless transmitter for transmitting a wireless data signal incorporating the wireless tag signal and location of the tag signal reader; and
a location processor for receiving the wireless data signal from the tag signal readers for determining which tag signals are first-to-arrive signals and conducting differentiation of the first-to-arrive signals relative to the location of the tag signal readers as determined by the global positioning system receivers to locate a tag transmitter and object coupled therewith.

2. A system according to claim 1, wherein said wireless tag signals comprise pseudo random spread spectrum radio frequency signals.

3. A system according to claim 1, wherein said location processor comprises a matched filter correlator.

4. A system according to claim 3, wherein said matched filter correlator further comprises matched filter banks having parallel correlators that correlate a received communications signal with time offset versions of a reference spreading code.

5. A system according to claim 1, wherein said location processor further comprises a plurality of processors for distributing processing capability.

6. A system according to claim 1, wherein three tag signal readers are used for determining the location of the object to be located.

7. A system according to claim 1, wherein each tag signal reader comprises a plurality of mutually diverse antennas for detecting wireless tag signals at each tag signal reader.

8. A system according to claim 1, wherein each tag signal reader further comprises a mobile device having a battery for self-powering the tag signal reader.

9. A system according to claim 8, wherein said wireless data signal transmitted from a tag signal reader further comprises telemetry information regarding power levels of a battery within the tag signal reader.

10. A system according to claim 1, wherein said wireless data signal transmitted from a wireless transmitter comprises a packet signal.

11. A system according to claim 10, wherein said packet signal comprises a header containing global positioning system information related to the location of a tag signal reader.

12. A system according to claim 1, wherein said global positioning system receiver at each tag signal reader comprises a differential global positioning system receiver.

13. A method for locating an object comprising the steps of:
generating a wireless tag signal from a tag transmitter coupled with an object to be located to a plurality of tag signal readers, said tag signals having data indicating the identity of the object to which the tag transmitter is coupled, each tag signal reader further comprising a global positioning system receiver associated therewith for determining the location of a tag signal reader;
transmitting a wireless data signal incorporating the wireless tag signal and location of the tag signal reader;
receiving the wireless data signal from the tag signal readers within a location processor; and
determining within the location processor which tag signals are first-to-arrive signals and conducting differentiation of the first-to-arrive signals relative to the location of the tag signal readers as determined by the global positioning system receivers to locate a tag transmitter and object coupled therewith.

14. A method according to claim 13, and further comprising the step of transmitting the wireless tag signals as pseudo random spread spectrum radio frequency signals.

15. A method according to claim 13, and further comprising the step of processing the wireless data signals within the location processor using a matched filter correlator.

16. A method according to claim 15, and further comprising the step of processing with matched filter banks having parallel correlators that correlate a received communications signal with time offset versions of a reference spreading code.

17. A method according to claim 13, and further comprising the step of distributing processing capability within the location processor by using a plurality of processors.

18. A method according to claim 13, and further comprising the step of using three tag signal readers for determining the location of an object.

19. A method according to claim 13, and further comprising the step of receiving tag signals with mutually diverse antennas.

20. A method according to claim 13, and further comprising the step of self-powering a tag signal reader using a battery.

21. A method according to claim 20, and further comprising the step of transmitting telemetry information regarding power levels of a battery within a tag signal reader.

22. A method according to claim 13, and further comprising the step of transmitting the wireless data signal as a packet signal.

23. A method according to claim 22, and further comprising the step of transmitting a header within the packet signal that contains global positioning system information related to the location of a tag signal reader.

* * * * *